H. C. EMERICK.
RIM TOOL.
APPLICATION FILED AUG. 22, 1914.

1,140,806.

Patented May 25, 1915.

Witnesses
F. B. Wooden.
R. Scott.

H. C. Emerick
Inventor
by C. A. Snow & Co.
Attorneys

UNITED STATES PATENT OFFICE.

HARRY C. EMERICK, OF HARRISBURG, PENNSYLVANIA.

RIM-TOOL.

1,140,806.

Specification of Letters Patent.

Patented May 25, 1915.

Application filed August 22, 1914. Serial No. 858,100.

*To all whom it may concern:*

Be it known that I, HARRY C. EMERICK, a citizen of the United States, residing at Harrisburg, in the county of Dauphin and State of Pennsylvania, have invented a new and useful Rim-Tool, of which the following is a specification.

The present invention relates to improvements in rim tools.

One object of the present invention is the provision of a means whereby the demountable rims for automobile tires and the like, may be properly collapsed and held in such collapsed condition, while the outer casing and inner tube is being removed and replaced thereupon, thus normally holding the parts in the desired collapsed position so as to render the operation easy.

A further object of the present invention, is the provision of a tool of this character, which is provided with a plurality of rim engaging members, one of which members is adjustable and so constructed as to permit of the manipulation thereof to contract or permit the expansion of the rim during the removal and placing of an outer casing thereupon.

A still further object of the present invention, is the provision of a simple tool of this character, which is readily adjustable to rims of different diameters and which is simple, durable and inexpensive in construction and thoroughly efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
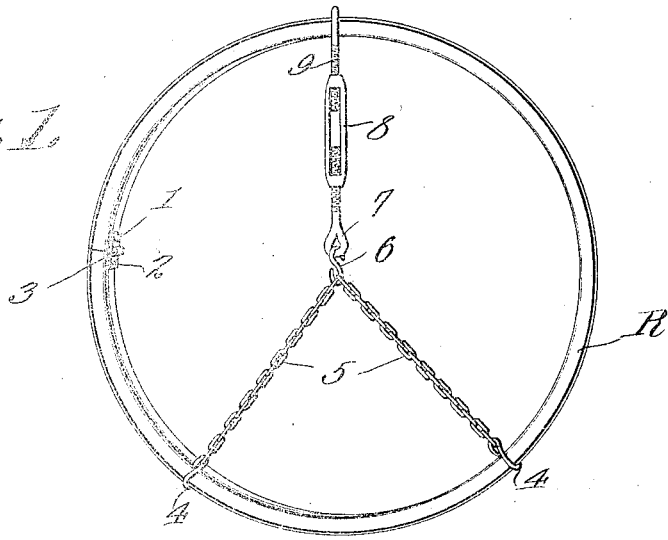
Figure 2:
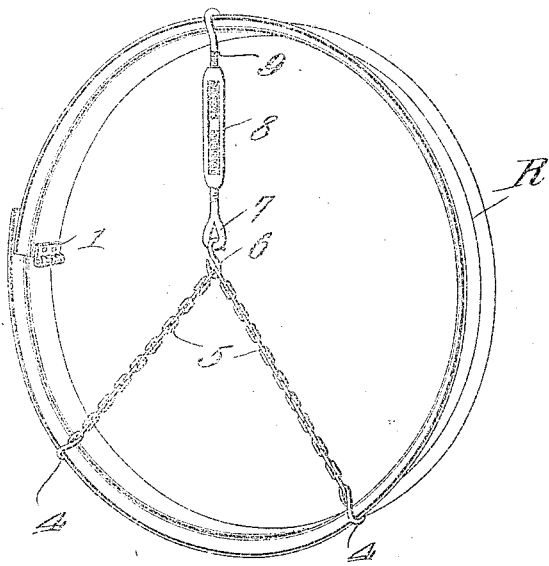
Figure 3:
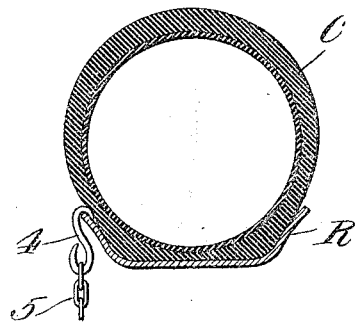

In the drawings—Figure 1 is a view demonstrating the initial engagement of the present tool with a demountable rim. Fig. 2 is a perspective view thereof showing the rim collapsed to permit of the easy removal or placing of the tire thereupon. Fig. 3 is a section through a tire and rim showing one of the rim engaging members of the present device.

Referring to the drawings, R designates a demountable rim, which is provided with the two connecting plates 1 and 2 which are held together by means of a removable pin 3, this being of usual construction. In order that the operation of collapsing the rim and maintaining the rim in such collapsed condition to permit of the easy removal of the outer casing C, may be accomplished, there are provided two hooks 4 for engaging the rim as illustrated in Fig. 3, and each one of the hooks 4 is carried by its individual flexible connection or chain 5, the inner ends of which engage the S-shaped hook 6 which is also engaged by the eye bolt 7, which in turn is engaged by the turn buckle 8, a hooked bolt 9 being also engaged by the turn buckle for engagement with the edge of the demountable rim. Thus in using the present device, the hooks 4 and the hooked bolt 9 are assembled as illustrated in Fig. 1. When the turn buckle 8 has been operated sufficiently to hold the connections taut, without placing any undue strain upon the rim, the pin 3 is removed, thus permitting of the ready operation of the turn buckle 8 to cause the ends to overlap as shown in Fig. 2, thus collapsing the rim and rendering the easy removal of the outer casing and the inner tube. The chain 5 may be of any other structure, as for instance, wire cables or the like, it being desirable that the parts be made of a non-stretchable material. At the same time, the flexible connections 5 should be of such material that will permit the present device to be readily collapsed and packed in a small space. It will also be noted that in the disposition of the rim engaging members, such members will engage the rim at equi-distant points, and that therefore when the turn buckle 8 is operated upon, there will be no tendency of the rim engaging member to slip or slide and thus cause the accidental release of the rim when in collapsed condition. By this means, the rim may be maintained for any desired length of time collapsed as illustrated in Fig. 2, during the repair of the outer casing or the inner tube, and the proper positioning of the inner tube and outer casing upon the rim. When this is accomplished, the turn buckle 8 is released to permit of the extension of the rim and the assembling of the parts as illustrated in Fig. 1. It is also apparent that with a device of this character, wherein there are no spokes or hubs to which the present device may be attached, that the terminals thereof must be so disposed, as to have an equal strain placed thereupon so that the rim engaging members will be held in proper relation at all times during the initial engagement thereof with the rim before the pin 3 is removed and also when the rim is collapsed as illustrated in Fig. 2. Thus all of the members connected to the hook 6, must be held taut and equalize the strain so as to cause the respective rim engaging members to bear directly or radially against the rim.

What is claimed is:

1. A rim collapsing tool comprising a plurality of chains having rim engaging hooks, a pair of bolts, one having a rim engaging hook and the other having a hook engageable with the chains, and a turnbuckle connecting the bolts.

2. A rim collapsing tool embodying a plurality of chains having rim engaging hooks, a hooked rim engaging bolt, an eyebolt, a turnbuckle connecting the two bolts, and an S-shaped hook engageable with the chains an the eye of the eye bolt.

In testimony that I claim the foregoing as my own, I have hereto affixed my signature in the presence of two witnesses.

HARRY C. EMERICK.

Witnesses:
PHIL S. MOYER,
J. ROBERT BARR.